United States Patent [19]

Inashima et al.

[11] Patent Number: 4,689,684
[45] Date of Patent: Aug. 25, 1987

[54] DISCHARGE PROTECTING CIRCUIT FOR A TELEVISION RECEIVER

[75] Inventors: Satoshi Inashima, Tokyo; Kiyoshi Terada, Kanagawa; Hideo Wakabayashi, Chiba; Yoshiharu Tanaka, Kanagawa, all of Japan

[73] Assignee: Sony Corporation, Tokyo, Japan

[21] Appl. No.: 783,658

[22] Filed: Oct. 3, 1985

[30] Foreign Application Priority Data

Oct. 19, 1984 [JP] Japan .................. 59-219956

[51] Int. Cl.⁴ .................. H04N 5/63; H04N 5/68
[52] U.S. Cl. .................. 358/190; 358/243; 358/74
[58] Field of Search .................. 358/74, 64, 188, 190, 358/242, 243, 245, 168, 169, 166; 328/8; 361/91, 111, 119

[56] References Cited

U.S. PATENT DOCUMENTS

| | | | |
|---|---|---|---|
| 4,253,110 | 2/1981 | Harwood et al. | 358/168 |
| 4,435,731 | 3/1984 | Kliebphipat et al. | 358/190 X |
| 4,516,168 | 5/1985 | Hicks | 358/243 X |
| 4,520,397 | 5/1985 | Hibi | 358/243 |
| 4,521,811 | 6/1985 | Stoughton et al. | 358/168 |
| 4,523,295 | 6/1985 | Zato | 358/190 |
| 4,546,388 | 10/1985 | Williams, Jr. | 358/243 X |
| 4,591,914 | 5/1986 | Hakamada et al. | 358/190 |
| 4,599,643 | 7/1986 | Harlan | 358/74 |

Primary Examiner—Michael A. Masinick
Assistant Examiner—E. Anne Toth
Attorney, Agent, or Firm—Hill, Van Santen, Steadman & Simpson

[57] ABSTRACT

In a television receiver with a digital processing system for processing display parameters, a CRT discharge detector produces a signal in response to discharge of the cathode ray tube of the television receiver, and a control-reset circuit employs a signal for generating one or more reset pulses for holding the registers of the signal processing circuits in their reset state for the duration of the cathode ray tube discharge. Following termination of the discharge, the reset signal is removed which allows the signal processing circuits to resume their normal function with unaltered data.

5 Claims, 9 Drawing Figures

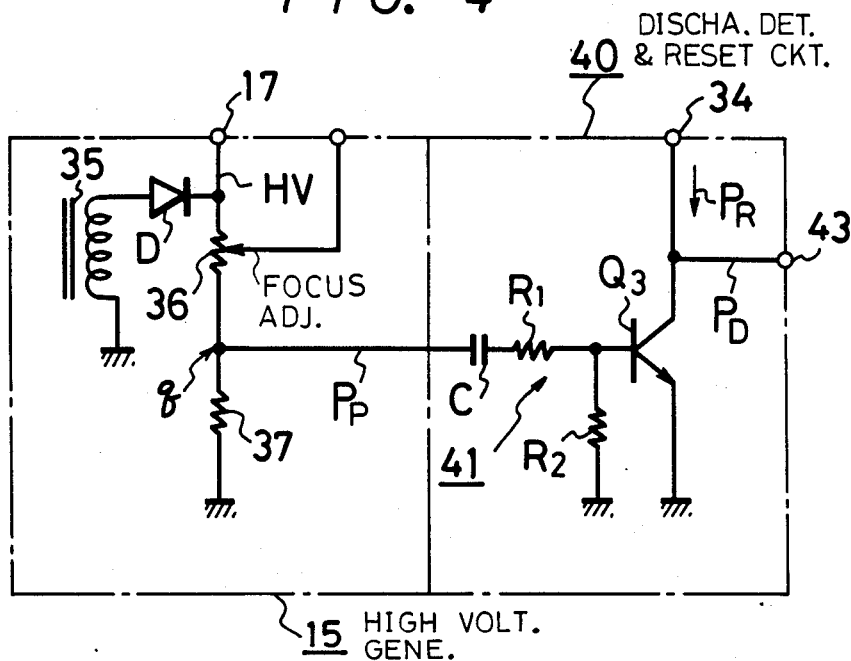
FIG. 4
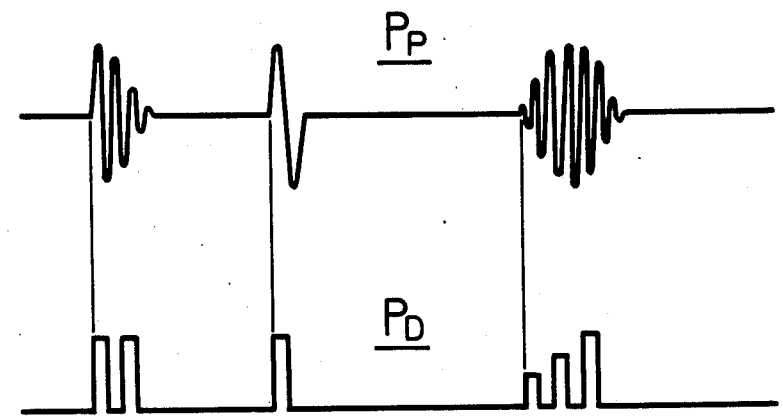
FIG. 5A
FIG. 5B

DISCHARGE PROTECTING CIRCUIT FOR A TELEVISION RECEIVER

BACKGROUND OF THE INVENTION

1. Field of the Invention

The present invention relates to a protecting circuit for a television receiver, and more particularly to a circuit for resetting the microcomputer system controlling the image display of the television receiver in response to detection of discharge of the receiver's cathode ray tube.

2. Prior Art

Modern television receivers frequently incorporate microcomputers for adjusting the image displayed on the television receiver controlling such factors as color, hue, contrast and brightness. These parameters can be selected at will by the operator, and representations of these parameters are issued by the microcomputer for adjusting the image which is displayed. The stored parameters can be freely changed by the operator, so that the desired viewing conditions can be achieved under a variety of different kinds of program materials.

It sometimes happens that the cathode ray tube of the television receiver is discharged, and in this event, a transient is created which sometimes disturbs the image processing, within the microcomputer system. Accordingly it is desirable to provide a means for recognizing a discharge condition for automatically preventing the changing of image processing parameters during the period of the discharge.

BRIEF DESCRIPTION OF THE INVENTION

It is a principal object of the present invention to provide apparatus for detecting the discharge of the cathode ray tube of a television receiver, and responding thereto for preventing the resetting of parameters stored in the microcomputer system used by the television receiver for adjusting the image displayed by the cathode ray tube.

The present invention achieves the advantage of automatically preventing alteration of the stored parameters or processed data by a transient created by discharge of the cathode ray tube. Thus the image display resumes with the same selected image processing parameters, when the discharge ends.

BRIEF DESCRIPTION OF DRAWINGS

Reference will now be made to the accompanying drawings in which:

FIG. 4 is a schematic diagram of the detector circuit for detecting discharge of the cathode ray tube;

. FIGS. 5A and 5B are a series of wave forms, relative to time, illustrating operation of FIG. 4.

DESCRIPTION OF THE PRIOR ART AND THE PREFERRED EMBODIMENT

Figure 6:
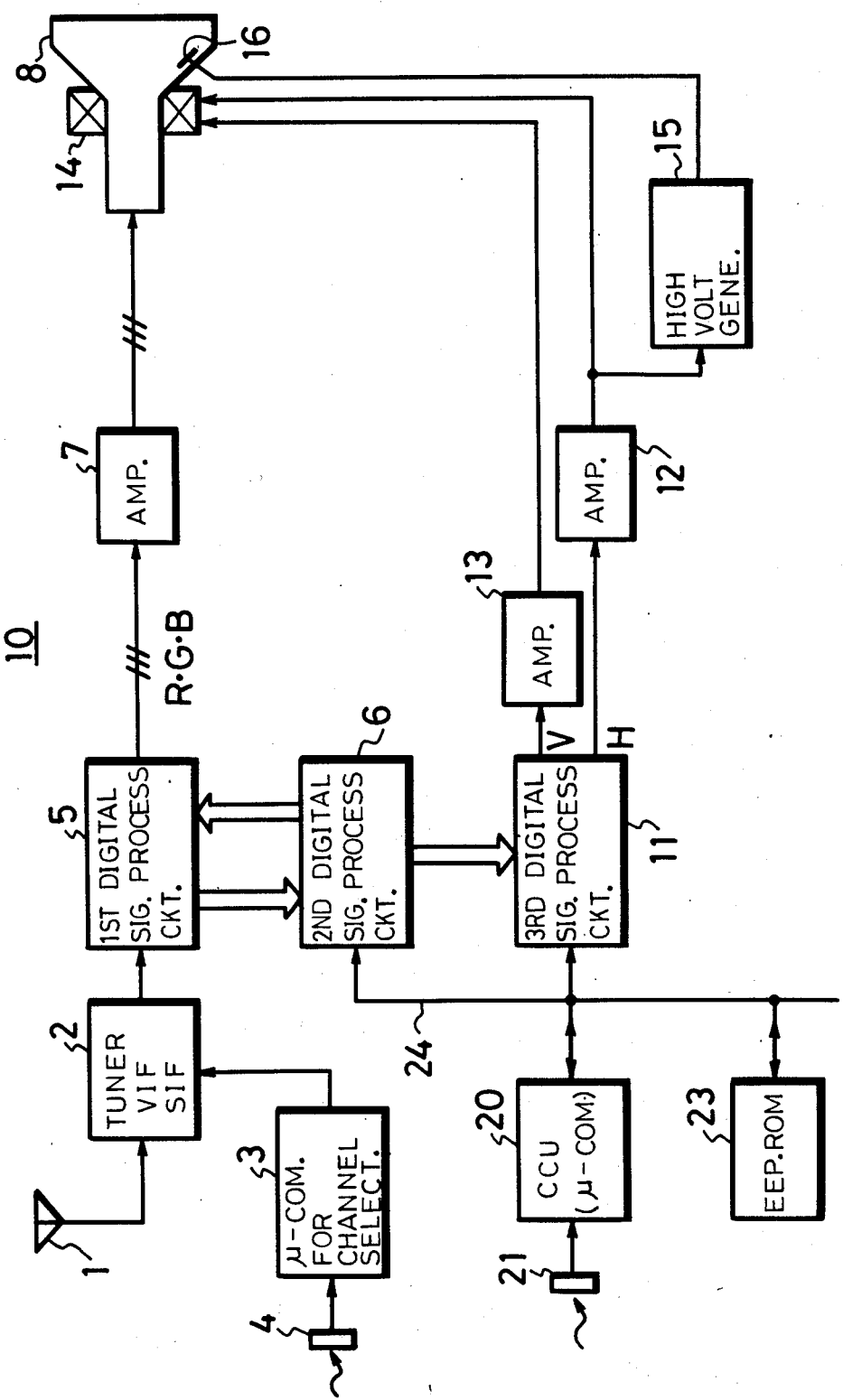
FIG. 6 is a functional block diagram of a television receiver in accordance with the prior art.

Referring to FIG. 6, a television receiver is illustrated in accordance with the teachings of the prior art. In the arrangement of FIG. 6, the video signal is processed in digital fashion. An antenna 1 of the receiver is connected to an analog video signal processing circuit 2. The processing circuit 2 incorporates a tuner, a video intermediate frequency amplifier, and an audio-intermediate frequency amplifier. A microcomputer 3 is connected to the signal processing circuit 2, and the microcomputer 2 accomplishes a channel selection electronically, in response to signals received from an input unit 4. Typically, the input unit 4 may be a light-receiving element which receives control signals from a manually operated commander or control unit, which may be manipulated by the operator to select the desired channel.

The video signal derived from the processing circuit 2 is connected to a first digital video signal processing circuit 5. In this circuit, the luminance signal is processed. The circuit includes an analog-to-digital converter, a gamma correcting circuit, a matrix circuit, and a digital-to-analog converter. The circuit 5 produces a digital chrominance signal, and a digital composite synchronizing signal, both of which are fed to a second digital signal processing circuit 6.

The processing circuit 6 incorporates a chrominance signal demodulating system, and various image processing circuits, for carrying out color demodulation and performing processing affecting image parameters such as color, hue, contrast and brightness. The circuit 6 produces a pair of digital color difference signals, which are fed back to the circuit 5. The circuit 5 employs these signals to produce analog primary color signals R, G, and B which are fed via a video amplifier 7 to the several color controlling inputs of the cathode ray tube 8.

The digital synchronizing signal from the second processing circuit 6 is supplied to a third digital signal processing circuit 11. The circuit 11 generates horizontal and vertical deflection signals H and V which are supplied through amplifiers 12 and 13 to the deflection apparatus or coil 14 of the cathode ray tube 8. Further, the output from the amplifier 12 is supplied to a high voltage generating circuit 15, which produces a high voltage which is supplied to the high voltage anode 16 of the cathode ray tube 8.

A central control unit (CCU) 20 incorporates a microcomputer which is responsive to signals derived from an input unit 21. The input unit 21 may be a light sensitive device responsive to a remote control unit, as described above in connection with unit 4. A data storage device 23 is provided, which may be an electrically erasable programmable read only memory (EEPROM). Both the CCU 20 and memory 23 are connected by a data bus 24 to the second processing circuit 6 and to the third processing circuit 11. On the basis of the data stored in the memory 23, the CCU 20 is able to control the second and third processing circuits for initializing the desired control parameters, and for modifying them on the basis of signals supplied through the input unit 21. When the parameters are to be modified, the input unit 21 controls the CCU 20 to cause the appropriate parameters to be stored in the memory 23.

The components making up the receiver of FIG. 6 are well known and therefore need not be described in detail. For example, the receiver may be constructed from integrated circuits marketed by International Telephone and Telegraph as its "Digit 2000 VLSI Digital TV System".

A problem in connection with operation of the prior art apparatus shown in FIG. 6 arises when the cathode ray tube 8 is discharged, producing a discharge transient which affects operation of the second and third processing circuits 6 and 11, through the power line, or through one of the signal lines. In this case, the initialized data and the processed or adjusted data stored in the various registers of the processing circuits 6 and 11, or the data stored in the memory 23, can be modified by being rewritten or erased. In this case, the image processing data becomes unreliable, so that the displayed image on the cathode ray tube 8 is disturbed.

Figure 1:
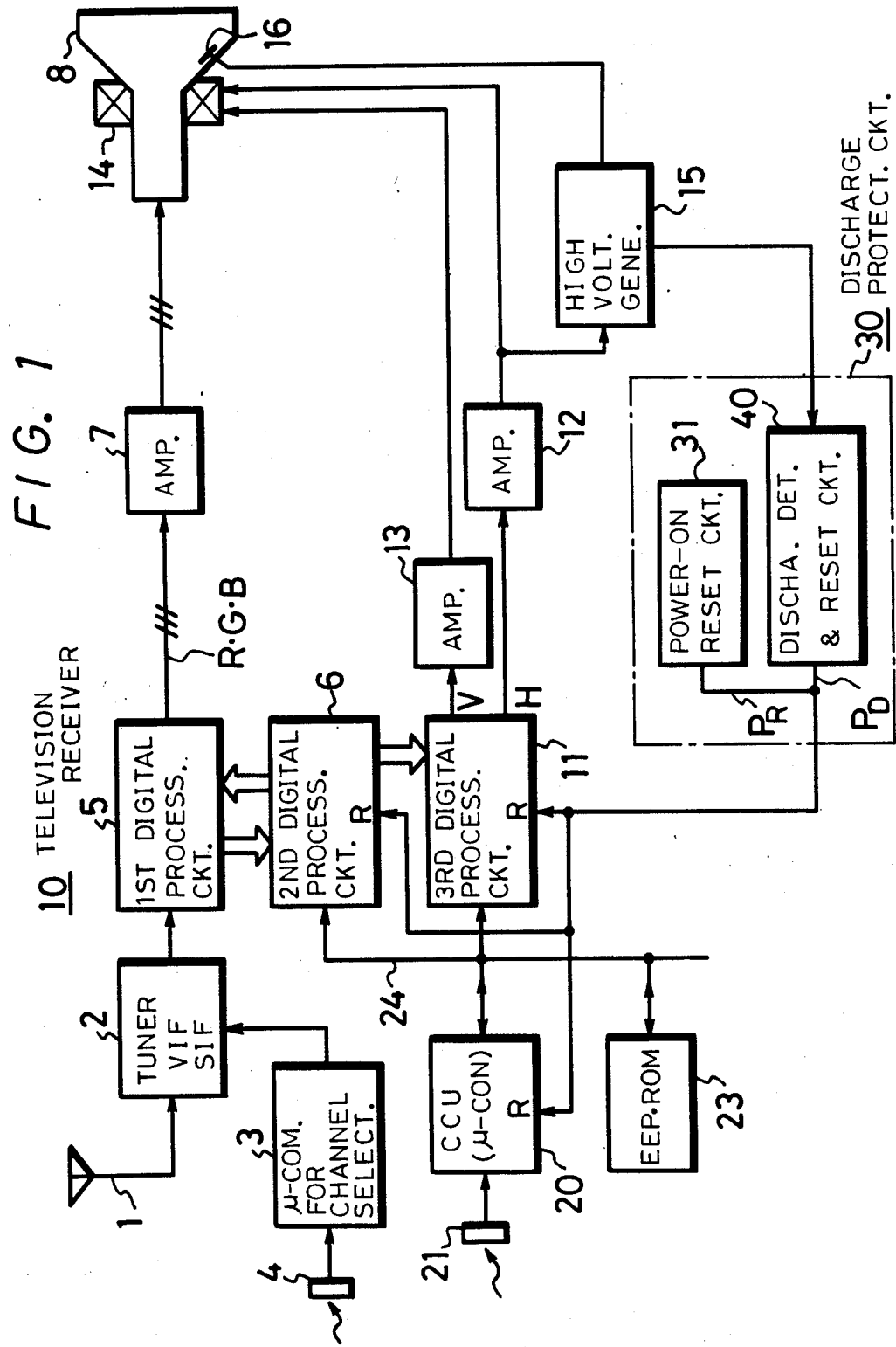
FIG. 1 is a functional block diagram illustrating a television receiver incorporating an illustrative embodiment of the present invention.

FIG. 1 illustrates a television receiver incorporating an illustrative embodiment of the present invention. It incorporates a discharge protecting circuit 30 which is connected to the high voltage generation circuit 15, for detecting a discharge of the cathode ray tube, in which case a reset pulse signal is generated which holds the signal processing circuits 6 and 11, and the CCU 20, in reset condition. The reset pulse persists for the duration of the discharge of the cathode ray tube 8, and when the discharge ends, the reset pulse signal is released, to allow further operation of the units 6, 11 and 20.

In FIG. 1, corresponding reference numerals are applied to the components corresponding to the elements of FIG. 6. The discharge protecting circuit 30 incorporates a power-on reset circuit 31 and a discharge detecting and reset circuit 40. The details of construction of the power-on reset circuit are illustrated in FIG. 2.

Figure 2:
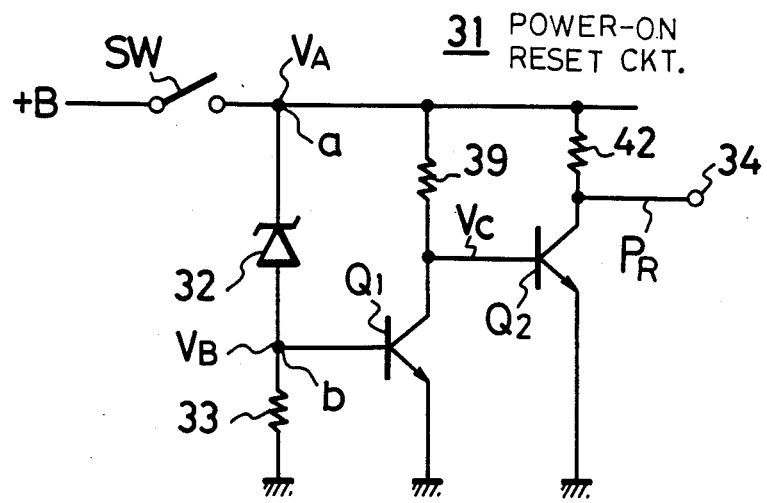
FIG. 2 is a circuit diagram of a resetting circuit incorporated in the apparatus of FIG. 1.

As shown in FIG. 2, a series circuit formed of a constant voltage (or zener) diode 32, and a resistor 33 is connected between the B+ power supply at point a and ground. The first transistor Q1 has its base connected to a point b between the diode 32 and the resistor 33, and a second transistor Q2 has its base connected to the collector of the first transistor Q1. An output terminal 34 is connected to the collector of the transistor Q2. Both the transistors Q1 and Q2 have their emitters grounded, and their collectors connected through load resistors 39 and 42, to the B+ supply at point a.

A power switch SW is connected between the source of B+ voltage and point a, so that point a is at operating voltage only when the switch is closed and the receiver is turned on.

Figure 3A:
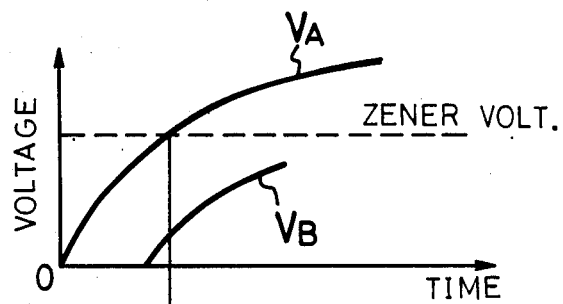
FIGS. 3A–3C are a series of wave forms, relative to time, illustrating operation of the apparatus of FIGS. 1 and 2.
Figure 3B:
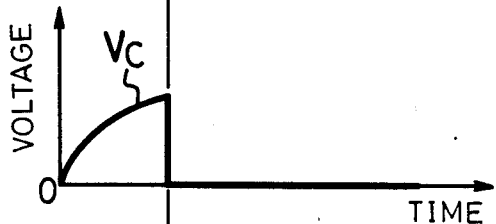
Figure 3C:
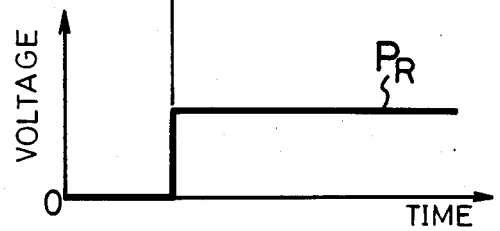

When the switch SW is first closed, to turn on the receiver, the voltage VA at point a increases from 0, as shown in FIG. 3A. When the voltage VA rises to a certain level, the constant voltage diode 32 begins to conduct and the voltage VB at point b also begins to rise, and when it exceeds the base-emitter operating voltage of the first transistor Q1, this transistor is turned on, and its collector voltage falls, as illustrated in FIG. 3B. This cuts off the second transistor Q2, which had been conducting, by base current flowing through the resistor 39 allowing the voltage at the output terminal 34 to rise to the level VA, as indicated in FIG. 3C. This forms the power-on reset pulse PR and the reset operation is performed in synchronism with the leading edge of the reset pulse. The leading edge of the power-on reset pulse is established by conduction of Q2 when the switch SW is first closed.

As shown in FIG. 1, the reset pulse PR is supplied to the CCU 20, and to the second and third digital processing circuit 6 and 11. Operation of these units is allowed to commence from predetermined initial conditions when the reset pulse terminates. Accordingly, faulty operation of the circuits 6, 11 and 20 is avoided during the initial turn-on of the television receiver before the operating voltages achieve their prescribed operating levels.

FIG. 4 illustrates a schematic diagram of the discharge detecting and reset circuit 40, in association with part of the high voltage generation circuit 5.

The high voltage generating circuit 15 includes a flyback transformer 35 with a secondary winding connected to a rectifying diode D. A predetermined high voltage HV is produced at an output terminal 17. To this output terminal 17, one end terminal of a potentiometer 36 (used for focus adjustment) is connected, and a resistor 37 is connected from the other end of the potentiometer 36 to ground. A discharge pulse PP is produced at a connection point q, between the potentiometer 36 and the resistor 37, on the occasion of any discharge of the cathode ray tube 8. A coupling capacitor C is connected to the point g to pass the discharge pulse to a voltage divider 41, incorporating resistors R1 and R2. The resistor R1 is connected from the capacitor C to the base of a transistor Q3. The emitter of the transistor Q3 is connected to ground and the base is also connected to ground through the resistor R2. The voltage divider 41 produces a potential at the base of the transistor Q3 which is a predetermined proportion of the voltage amplitude of the pulse PP.

The collector of the transistor Q3 is connected to an output terminal 43. A control current pulse PD is produced at the output terminal 43 in response to the discharge of the cathode ray tube 8.

FIG. 5 illustrates typical wave forms for the pulse PP, produced at point g, and the control current pulse PD, produced at the output terminal 43. The collector of the transistor Q3 is connected to point 34, in common with the collector of the transistor Q2. Since this point is also connected, through resistor 42, to the operating voltage at point a, the voltage level on the line connected to the reset inputs of the units 6, 11 and 20 (FIG. 1) is normally high, but is brought low, to hold these units in their reset states, during the duration of each control pulse PD, as well as during a power-on reset pulse PR.

The voltage divider circuit 41 functions to produce the control pulse PD only when the discharge pulse PP is produced. The discharge pulse PP has a peak value in a range from several 10s of volts, to several 100s of volts and occasionally several 1000s of volts. Noise pulses of lesser amplitudes do not trigger operation of the transistor Q3 and lead to false pulses at the output terminal 43. Since the discharge pulse is an AC transient, as shown in FIG. 5A, several successive control pulses PD are produced for alternate half cycles of the discharge pulses, as shown in FIG. 5B. The units 6, 11 and 20 can be designed to respond to each of the successive control pulses, but they are usually designed to have a time delay circuit which is triggered or retriggered by each of the control pulses and the reset operation is performed thereafter. Thus, the reset operation is performed only once in response to the last one of the successive pulses.

When a control pulse PD (or a power-on reset pulse PR) is simultaneously supplied to the circuits 6, 11 and 20, forcing those circuits to their reset states, processed data stored in the registers of the circuits 6 and 11 is maintained, since its alteration is inhibited as long as the discharge pulse PP persists. At the end of the discharge of the cathode ray tube 8, the control pulse PD vanishes, so that the CCU 20 and the second and third digital signal processing circuit 6 and 11 are released from being reset. Accordingly, they can continue to function in processing the image in the same manner as before the discharge of the cathode ray tube 8. This avoids any disturbance in the image being displayed.

Although FIG. 4 illustrates an arrangement for detecting the discharge pulse PP from the high voltage circuit, it will be appreciated by those skilled in the art that the discharge pulse PP could instead be detected as a transient on the power line. In this event, the resistance values used in the voltage divider 41 are adjusted to compensate for the different voltage level of the pulse PP.

It will be apparent that various other modifications and additions may be incorporated in the apparatus of the present invention without departing from the essential features of novelty thereof, which are intended to be defined and secured by the appended claims.

What is claimed is:

1. In a television receiver having a cathode ray tube and a microcomputer system for processing image adjusting data, means for resetting said microcomputer system when the television receiver is first powered-on, means for detecting discharge of the cathode ray tube of said television receiver after power has been supplied, and means for resetting said microcomputer system in response to the output of said discharge detection circuit.

2. Apparatus according to claim 1 wherein said television receiver has a high voltage generating circuit, and said discharge detecting circuit is connected to the high voltage generating circuit of the television receiver, for detecting a transient in the high voltage supplied to the cathode ray tube.

3. Apparatus according to claim 1 wherein said television receiver has a power supply, and said discharge detecting circuit is connected to the power supply of said television receiver, for detecting a transient caused by discharge of said cathode ray tube.

4. Apparatus according to claim 1 wherein said discharge detecting circuit incorporates a series connected capacitor and voltage divider, for producing a momentary control signal in response to detection of discharge of said cathode ray tube.

5. Apparatus according to claim 1 wherein said discharge detecting circuit incorporates a first output transistor having its collector connected to a control terminal, and wherein said means for resetting said microprocessor when the television receiver is first powered-on incorporates a second output transistor having its collector connected to said control terminal, means connecting said control terminal to reset inputs of the digital signal processing circuits of said television receiver for holding said circuits in their reset condition during conduction of either of said first or second transistors, and means for holding the collectors of said first and second transistors at a high potential during simultaneous non-conduction of both of said output transistors, for providing a high potential at said control terminal and allowing said digital processing circuits to function normally.

* * * * *